Patented Oct. 3, 1933

1,928,956

UNITED STATES PATENT OFFICE 1,928,956

BRAKE FLUID COMPOSITION

John W. Tatter, Chicago, Ill., assignor to Lewis Differential Company, Chicago, Ill., a corporation of Illinois No Drawing. Application March 22, 1930
Serial No. 438,247

10 Claims. (Cl. 252—5)

My invention is related to hydraulic brakes and other fluid pressure actuated mechanisms and more particularly to a fluid composition adapted for use with automotive vehicle and aircraft hydraulic braking devices.

Experience has shown that a large number of fluids are not suitable for use in hydraulic braking devices that are subjected to the usually encountered variations in temperatures as their viscosity does not remain within suitable physical limits under such varying temperature conditions. Subzero and below freezing temperatures often cause the fluid to stiffen or partially congeal thereby reducing the effectiveness of the brakes if not entirely destroying their usefulness.

It is the object of my invention to improve the braking efficiency of hydraulic braking devices exposed to extreme variations in temperatures by providing a fluid therefor whose viscosity will remain substantially constant under such varying temperature conditions.

A further object of my invention is to provide a fluid for use with hydraulic braking devices that may be economically manufactured and which will not break down or require servicing of the braking mechanism.

A still further object is to provide a fluid composition having relatively small change in its volume under variations in temperature. I have thus provided a solution which includes a relatively large percentage of water which not only reduces the cost of the fluid but minimizes the aforesaid volume change under temperature variation.

For a more detailed understanding of my invention reference may be had to the following description describing one form which my invention may assume.

I provide a fluid, for use in hydraulic braking devices comprising a base of commercial ethylene glycol preferably about 50% by volume, 37% to 45% of water by volume, and from 13% to 5% by volume of lubricating solution that readily goes into solution with the other ingredients. I preferably employ a sulphurated castor oil commercially known as "Turkey Red Oil" as a lubricating solution which I find will very readily mix with the other ingredients.

When employing sulphurated castor oil, I preferably mix about 13% of sulphurated castor oil by volume with approximately 50% by volume of ethylene glycol and approximately 37% by volume of water. I have found that this fluid composition will not appreciably start to congeal until it is exposed to a temperature of about 58° F. below zero. At about 82° F. below zero this fluid becomes rather thick and doughlike. In addition, this fluid will not injure rubber or other materials which are customarily employed as sealing medium in the master cylinder and wheel cylinders of a vehicle brake system. Furthermore the tendency of any metal parts to rust is eliminated due to the lubricating qualities of the castor oil. An increase in the percentage of ethylene glycol with a corresponding decrease in the water content will further lower the aforesaid critical temperatures. However I find that the percentages substantially as stated above will give very satisfactory use. My improved fluid composition changes in volume substantially 4% in about 150° F. temperature change within climatic ranges usually encountered whereas fluids usually employed heretofore have a change of about 10% for the same temperature range. Thus my fluid tends to minimize any influence on the brake system by reason of its change in volume.

As a modification of my invention I may employ, in place of the sulphurated castor oil, a soft soap or like substance such as linseed oil soap. The latter substance dissolves readily in distilled water and has excellent qualities for lubricating the brake parts exposed to the fluid and also for preventing rust formation.

With this combination of substances, I preferably employ about 50% by volume of ethylene glycol, 45% to 40% of water by volume (preferably distilled) and 5% to 10% by volume of a suitable soft soap such as linseed oil soap. This fluid composition is perfectly satisfactory under normal conditions of usage contemplated by my invention although I find that its viscosity is noticeably effected at slightly higher temperatures than that which will effect the viscosity of the sulphurated castor oil solution. To be specific, this fluid will start to congeal at about 48° F. below zero and become rather thick at about 70° F. below zero. The soap used in this composition should be such that it will not readily emulsify.

Although I have described in detail but a single application of my invention, it will be apparent to those skilled in the art to which my invention pertains that various modifications and changes may be made therein without departing from the spirit of my invention or from the scope of the appended claims.

What I claim as my invention is:

1. A fluid for hydraulic braking devices comprising in solution, ethylene glycol, water, and sulphurated castor oil, said ethylene glycol forming a greater proportion of said solution than that formed by either of said water or said sulphurated castor oil.

2. A fluid for hydraulic braking devices comprising in solution, ethylene glycol, water, and soap, said ethylene glycol constituting the largest ingredient of said solution.

3. A fluid for hydraulic braking devices comprising in solution, a base of about 50% by volume of ethylene glycol, approximately 37% to 45% by volume of water, and about 5% to 13% by volume of soap.

4. A fluid for hydraulic braking devices comprising in solution, a base of about 50% by volume of ethylene glycol, about 37% by volume of water, and about 13% by volume of sulphurated castor oil.

5. A fluid for hydraulic braking devices comprising in solution, a base of about 50% by volume of ethylene glycol, about 45% by volume of water, and about 5% by volume of a solution of linseed oil soap.

6. A fluid for brake devices comprising a liquid solution containing water in approximately 37% to 45% by volume and ethylene glycol for lowering the freezing point of liquid solution below that of water, and sulphurated castor oil having anti-rust characteristics.

7. A fluid for brake devices comprising a liquid solution containing water of 37% by volume, ethylene glycol for lowering the freezing point of liquid solution below that of water, and linseed oil soap.

8. A fluid for brake devices comprising a liquid solution containing water in excess of approximately 25% by volume, and ethylene glycol as a preponderant ingredient of said liquid solution to lower the freezing point of the water for the purpose specified and linseed oil soap.

9. A fluid for brake devices comprising a liquid solution containing water in excess of approximately 25% by volume, and ethylene glycol as the major proportion of said liquid solution to lower the freezing point of the water for the purpose specified and sulphurated castor oil.

10. A fluid for hydraulic braking devices comprising in solution, water, linseed oil soap, and ethylene glycol, said ethylene glycol constituting the largest single ingredient proportion of said solution.

JOHN W. TATTER.